Figure 1:
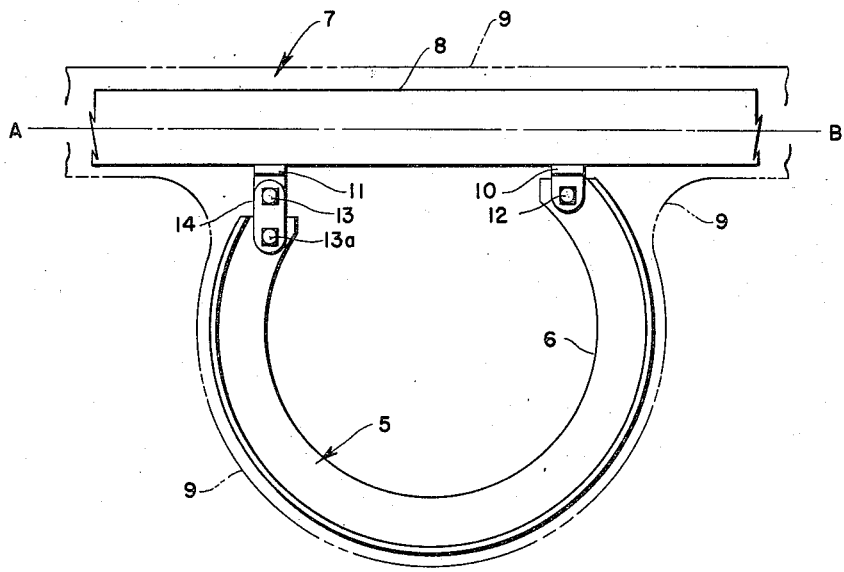

Jan. 16, 1951 G. SNYDER 2,538,433
ATTACHMENT MEANS FOR AIRCRAFT COMPONENTS
Filed Oct. 28, 1947

George Snyder
*INVENTOR.*

BY *James M. Clara*

HIS PATENT ATTORNEY

Patented Jan. 16, 1951

2,538,433

UNITED STATES PATENT OFFICE 2,538,433

ATTACHMENT MEANS FOR AIRCRAFT COMPONENTS

George Snyder, Seattle, Wash., assignor to Boeing Airplane Company, a corporation of Delaware Application October 28, 1947, Serial No. 782,585

6 Claims. (Cl. 244—117)

The present invention relates to aircraft construction and more particularly to improved means for attaching the wing and fuselage structures of aircraft.

It has heretofore been the general practice in airplane design to attach the wing and fuselage structures to each other by means of relatively fixed joints of the pin, riveted, bolted or other types. These prior connections or attachments are usually made between the spars of the wing and the spar bulkheads or rings of the fuselage, and in stressed-skin construction, are made directly between the wing and fuselage envelopes. This prior practice has been followed in both monoplanes and biplanes, in cantilevered and braced wings, as well as in monoplanes of the high, low and mid-wing types. The major forces to which the wing surfaces are subjected, whether in flight or upon the ground, are applied essentially in a vertical direction and cause bending of the wing spar, or spars, in the transverse or spanwise direction.

In existing wing-to-fuselage connections, even of the single pin type where the axis of the pins passes through the neutral axis of the wing spar, loading and deflection of the spar causes a change in the lateral distance between the connections. A corresponding change in dimension will, of course, occur in the opposite direction when the loading upon the wing is reversed. When the wing is directly attached to the body or fuselage, the latter must deflect an equal amount, and it has been found that such deflections have had undesirable effects, and may in certain cases cause structural failure of the body structure. In such prior constructions, loading of the fuselage and deflection of the fuselage formers will also unnecessarily stress the wing structures through such rigid connections.a In addition, in the manufacture and assembly of the airplane, these terminal bolts in the fuselage and wing structures are required to be very accurately located and frequently require the use of relatively expensive jigs and other means to facilitate their accurate fitting and assembly.

The present invention avoids these prior disadvantages and difficulties by the provision of a "flexible" or floating connection at one side of the fuselage and the use of a conventional "fixed" connection at the other side of the fuselage to carry the side loads which are required to be transmitted between the fuselage and the wing structures. The floating or "flexible" wing-to-fuselage connection may be in the form of a pin-connected link or similar means interconnecting the two structures in order that resulting stresses are not developed in the fuselage structure.

It is accordingly a major object of the present invention to prevent secondary stresses from being developed in the body or fuselage structure as a result of the deflections which are necessarily developed within the loaded wing structure and vice versa. It is a further and equally important objective of the invention to simplify the assembly and manufacture of the aircraft, particularly with respect to the simplification of the location of the terminal bolts or pins in the body and wing structures. It is a further object to provide relatively simple and inexpensive means for obtaining the foregoing objectives and which are at the same time equally useful under the effect of landing loads as well as the loads imposed upon the structure during flight.

Figure 2:
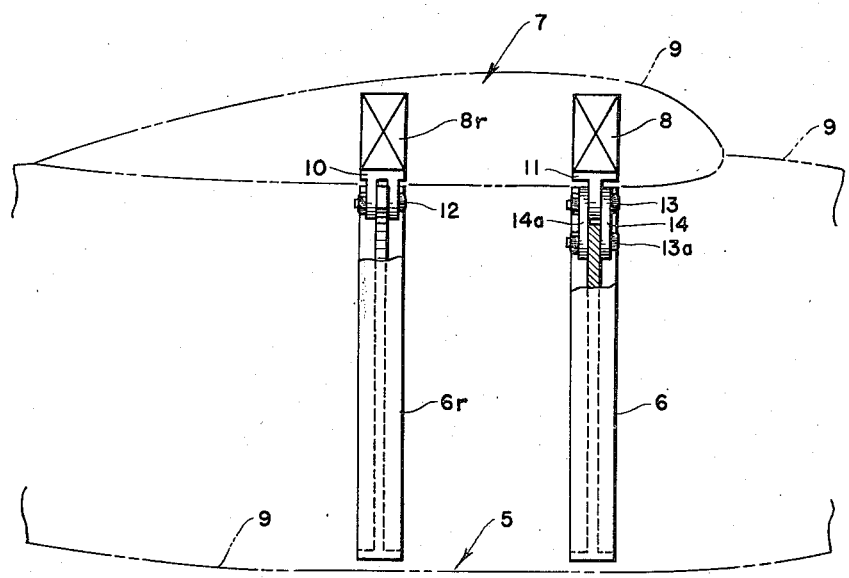

A further object of the present invention resides in the provision of improved wing-to-fuselage connections which relieve the fuselage from the possibility of structural failure or excessive deflection, and are of particular advantage in pressurized aircraft in maintaining the stresses and deflections in such fuselages within the limits at which they safely maintain internal pressures with a minimum of leakage. It is a still further object to prevent the development of secondary stresses in the wing structure due to the restraint of rigid fuselage connections. Other objects and advantages of the present invention will occur to those skilled in the art after reading the present description in conjunction with the accompanying drawings forming a part hereof, in which:

Figure 1 is a diagrammatic illustration of a wing-to-fuselage attachment embodying a form of the present invention as applied to a high wing monoplane; and Figure 2 is a diagrammatic side elevation, partly broken away, of the construction shown in Figure 1.

Referring now to Figure 1, the numeral 5 represents the fuselage portion of a high-wing monoplane provided with an arcuate spar bulkhead or ring 6, a high wing 7 and a transverse wing spar 8. The body or fuselage 5, as well as the wing 7, is covered in a conventional manner with skin coverings which may be of the stressed- or unstressed-skin type, as indicated by the construction lines 9. The wing spar 8, which may be of any suitable cross-section, is provided with connecting lugs 10 and 11 which are rigidly attached to the spar and extend downwardly toward the terminal portions of the fuselage spar bulkhead, or ring 6. In the event the cross-section of the wing spar 8 is symmetrical, both vertically and in a chord-wise direction, it will have a neutral axis which may be represented by the line A—B.

The wing spar connecting lugs 10 and 11 are suitably apertured to receive pins such as are indicated at 12 and 13. For the purposes of the present description, the connections of the spar 8 through its bifurcated connecting lug 10 and the pin 12 to the bulkhead 6 at the right side of Figure 1 will be regarded as a relatively "fixed" or "rigid" wing-to-fuselage connection and represents in a diagrammatic manner conventional pin connections which have been utilized heretofore in aircraft construction. While pin connections of this type frequently permit limited rotational movement about the pin axis and between the bulkhead ring 6 and the spar 8, prior to the assembly of the connection at the opposite side of the fuselage, the pin connection 12 between the bulkhead ring 6 and the spar lug 10 will be regarded as "fixed" or "rigid." From the standpoint of the axis of the pin 12 defining coinciding axes of both the ring 6 and the spar 8, and while the members are relatively movable with respect to each other, these axes remain coincident and co-axial, and as far as the axis of this pin 12 is concerned it is "fixed."

The spar connecting lug 11 at the left side of Figure 1 is similarly apertured to receive a pin 13 which passes through the apertured upper terminals of short links 14 and 14a, as shown in Figure 2. The lower terminals of the links 14 and 14a are also suitably apertured, as is also the adjacent portion of the fuselage bulkhead ring 6 to receive a similar pin 13a. The connection at the left side of Figure 1, represented by the spar lug 11, the connecting links 14 and 14a, and the pins 13 and 13a will be referred to as a "flexible" connection for the purposes of the present description as distinguished from the "fixed" connection represented by the lug 10 and the pin 12. It will, accordingly, be noted that the "flexible" connection at the left of the fuselage 5, also shown at the right or forward connection in Figure 2, is accomplished by the shortening of the bulkhead ring 6 on that side and the insertion of links 14 and 14a, are pivotally connected by the pins 13 and 13a to the lug 11 and the ring 6, respectively. In this latter "flexible" connection, there is no single or common pin axis about which either the ring 6 or the spar 8 may be partially rotated with respect to the other, and all of the elements attached by the pins 13 and 13a are freely rotatable in a transverse sense about the axis of either or both pins. With the connection at the lug 10 on the right side of the fuselage open or disconnected, either the spar 8 or the bulkhead ring 6 could be moved with respect to the other member without imparting any movement to it, due to the lost-motion or "flexible" means provided by the links 14 and 14a. Similarly with the connection at the lug 10 completed by the installation of the pin 12, should any bending, expansion, contraction or other deflection occur in the lower portion of the spar 8 to cause any change in the dimension or distance between the lugs 10 and 11, such change in dimension will merely cause a rocking of the links 14 and 14a about the longitudinal axis of the pin 13a by which it is connected to the bulkhead ring 6 without the application of any forces to the latter.

Referring now to Figure 2, there is shown the fuselage 5 and the wing 7 having suitable skin covering as indicated by the construction lines 9. Within the fuselage 5 are positioned the bulkhead rings 6 and 6r attached to the fore and aft spars 8 and 8r of the wing 7. For purposes of illustration, identical rings 6 and 6r, as to shape and size, have been used, altho they need not be identical and one or more could be used. The fixed pivotal connections, however as well as the flexible link connections should preferably be kept on their same respective axes. The forward installation shows the flexible link connection 11—14 while the fixed pivot connection 10—12 is illustrated at the rear or left of Figure 2.

The forward ring 6 in Figure 2 has a portion of its flange removed to show the flexible links 14 and 14a pivotally joined at their lower terminals to the web of the ring 6 by the pin 13a. Similarly, the flexible links 14 and 14a are pivotally joined, at their upper terminals, to the spar lug 11, which is mounted on the forward spar 8, by the pin 13. The aft ring 6r also has a portion of its flange removed in Figure 2 to more clearly show the fixed pivot 12 which pivotally joins the aft ring 6r to the bifurcated spar lug 10 mounted on the rear spar 8r of the wing 7.

It will be appreciated that as the wing 7 is loaded, as in flight, the material in the lower portion of the spar 8 must stretch under the influence of the tensile forces which are then developed, and accordingly the dimension between the lugs 10 and 11 or any two similar points will increase. Under certain circumstances, and particularly in large aircraft, this change of dimension is appreciable. For example, an aluminum alloy with a modulus of elasticity of 10,000,000 pounds per square inch loaded to 50,000 pounds per square inch will elongate 0.005 inch per inch; and in the event the wing terminals of such a wing are spaced 150 inches apart, as they may be in a relatively large airplane, the actual dimension between these terminals will increase by 0.75 inch. A corresponding change will, of course, occur in the opposite direction in the event the wing loading is reversed, as it may be when the aircraft is at rest upon the ground, or as may occur in the event the aircraft is flown in inverted flight. In prior constructions where the wing is directly attached, or as by two connections of the "fixed" type shown at the right in Figure 1, the body structure must deflect an equal amount with the wing structure, and it may well be that such deflections will cause structural failure of the body structure, or have other undesirable effects or results.

It will, accordingly, be seen that the improved construction herein disclosed avoids these prior difficulties by the use of a "fixed" connection at one side of the fuselage and the use of a "flexible" connection in the form of the links 14 installed at the opposite side of the fuselage. It can be visualized from a study of the diagrammatic construction shown in Figure 1, that an extreme elongation in the lower portion of the spar 8 between the lugs 10 and 11 will cause the links 14 and 14a to assume an angular position in which the axis of the upper pin 13 is outboard or outside of the axis of the lower pin 13a; and where such elongation is of sufficient magnitude to cause relatively large tilting or inclination of the links 14 and 14a its lower terminal will lift the pin 13a and the attached terminal of the bulkhead frame 6 slightly upwardly, while rocking the frame 6 slightly about the axis of the relatively fixed pin 12, without causing appreciable secondary stresses within the bulkhead ring 6.

It will be noted from the modifications shown in Figures 1 and 2, that the "fixed" pin connection can be located at either side of the fuselage just so long as a "flexible" connection is provided at the opposite side, and the axes of all of the pins are parallel and longitudinally disposed. It should also be noted that the construction shown has been simplified and diagrammatically illustrated to facilitate an understanding of the principles of the present invention and that the precise form and arrangement of the flexible links and other elements of the connections may be designed to meet the specific requirements of the individual installation without departing from the novel principles described. In this connection, it might be stated that the disclosed construction is equally adapted for "frame-and-skin" construction or "stressed-skin" construction; and also that the wing 7 may be located at the bottom of the fuselage or hull; below the same; or entirely above the fuselage; or at any intermediate elevation. It will also be understood that while the bulkhead rings 6 and 6r are shown as arcuate, or as the interrupted part of a circular or annular shape, they can be made completely circular, elliptical or in fact of any cross-sectional shape in which aircraft fuselages are built.

Other forms and modifications of the present construction both with respect to its general arrangement and the details of its respective parts are intended to come within the scope and spirit of the present invention as more particularly defined in the appended claims.

I claim:

1. In aircraft construction: a wing having a transverse spar; a fuselage having a transversely disposed former ring; said former ring having apertured portions adjacent said wing spar; a first apertured fitting attached to said wing spar engaging a first apertured portion of said former ring; longitudinally extending pin means engaging the apertures in said fitting and said former ring portion for transmitting loads between said wing spar and said former ring while permitting relative rotative movements therebetween about the axis of said pin means within said transverse plane; a second apertured fitting fixedly attached to said spar adjacent a second apertured portion of said former ring laterally spaced from said first portion; link means having apertures aligned with those of said fitting and those of said adjacent ring portion; and longitudinally disposed pins engaging said aligned apertures in said link means, said second fitting and said second former ring portion for the transmission of loads between said wing spar and said former ring while permitting relative movements between said second former ring portion, said wing spar and said link means with respect to each other within said transverse plane.

2. In aircraft construction: a wing having a transverse spar; a fuselage having an arcuate former ring disposed in substantially the same transverse plane as said wing spar; said former ring having apertured ends terminating adjacent said wing spar; said former ring having a transversely extending web portion; an apertured bifurcated fitting attached to said wing spar embracing a terminal of said former ring; longitudinally extending pin means engaging the apertures in said bifurcated fitting and said former ring terminal for transmitting loads between said wing spar and said former ring while permitting relative movements therebetween within said transverse plane; an apertured fitting fixedly attached to said wing spar adjacent the opposite terminal of said former ring; a pair of apertured links each having apertures aligned with those of said fitting and said opposite ring terminal; and longitudinally extending pins engaging said aligned apertures in said links, said fitting and said former ring terminal for the transmission of loads between said wing spar and said former ring while permitting relative movements between said second former ring terminal with respect to said wing spar within said transverse plane.

3. In aircraft construction, attachment means for connecting a transversely extending wing spar to a transversely extending fuselage frame member comprising a single pivotal connection between said wing spar and said fuselage frame member at a first attachment portion including a single longitudinally extending pivot pin means engaging aligned apertures in said wing spar and said fuselage frame member for transmitting loads between said wing spar and said fuselage former member while permitting relative rotative movement therebetween about the axis of said longitudinally extending pivot pin means within a transverse plane, and a pivotal linkage interconnection including two spaced pivot pin means at a second attachment portion laterally spaced with respect to said first attachment portion the axes of said three pivot pin means being arranged in such manner that they define a stable triangular attachment arrangement having its three legs formed respectively by said wing spar, said fuselage frame member and said linkage interconnection.

4. A structural joint for attaching a transversely extending wing member to a transversely extending fuselage member at two transversely disposed positions, said wing and fuselage members each provided with a longitudinally aligned aperture at a first of said transversely disposed positions, a single longitudinally extending pin means engaging said aligned apertures at said first position for transmitting loads between said wing member and said fuselage member while permitting relative rocking movement therebetween about the longitudinal axis of said pin means within said transverse plane, said wing and fuselage members provided with spaced apertures at the second of said transversely disposed positions, apertured link means extending between and having its apertures longitudinally aligned with the said spaced apertures in said wing and fuselage members, and further pin means engaging the said spaced aligned apertures in said wing and said fuselage members at said second position.

5. An aircraft construction of the type set forth in claim 1, characterized by said fuselage former ring having a portion adjacent said transverse spar removed such that the ends of said former ring terminate in the regions of the respective apertured attachment portions.

6. An aircraft construction of the type set forth in claim 4 characterized by said transversely extending fuselage member having a substantially U-shaped configuration with its open side closed by the portion of said wing member intermediate said transversely disposed attachment positions.

GEORGE SNYDER.

REFERENCES CITED

The following references are of record in the file of this patent:

UNITED STATES PATENTS

| Number | Name | Date |
|---|---|---|
| 1,780,812 | Burnelli | Nov. 4, 1930 |

FOREIGN PATENTS

| Number | Country | Date |
|---|---|---|
| 25,720 | Denmark | Mar. 10, 1920 |
| 557,729 | Great Britain | Dec. 2, 1943 |